United States Patent [19]  
Kruschwitz et al.

[11] 4,343,121  
[45] Aug. 10, 1982

[54] WINDOW GLASS MOUNTING ARRANGEMENTS

[75] Inventors: Werner Kruschwitz; Heinz Andrzejewski, both of Viersen, Fed. Rep. of Germany

[73] Assignee: Draftex Development AG, Zug, Switzerland

[21] Appl. No.: 79,033

[22] Filed: Sep. 26, 1979

[30] Foreign Application Priority Data

Oct. 14, 1978 [GB] United Kingdom ............... 40604/78  
Dec. 28, 1978 [GB] United Kingdom ............... 50174/78

[51] Int. Cl.³ .............................................. E06B 3/62  
[52] U.S. Cl. ...................................... 52/208; 52/397; 52/400; 52/716; 428/122; 428/217; 428/358  
[58] Field of Search ................. 52/208, 400, 397, 716; 428/122, 358, 217

[56] References Cited

U.S. PATENT DOCUMENTS

| | | | |
|---|---|---|---|
| 2,093,614 | 9/1937 | Lynch | 52/208 |
| 2,609,071 | 9/1952 | Morgann et al. | 52/400 |
| 2,814,525 | 11/1957 | Thomas | 52/400 X |
| 3,150,421 | 9/1964 | Lickert | 52/208 |
| 3,189,143 | 6/1965 | Adams | 52/400 X |
| 3,197,821 | 8/1965 | Bright | 52/716 X |
| 3,200,448 | 8/1965 | Bright | 52/716 X |
| 3,310,928 | 3/1967 | Weimar | 52/716 |
| 3,638,359 | 2/1972 | Kruschwitz | 428/122 X |
| 3,744,201 | 7/1973 | Dochnahl | 52/400 |
| 3,837,957 | 9/1974 | Mesnel | 52/716 X |
| 3,993,819 | 11/1976 | Fewkes | 52/716 X |
| 4,001,994 | 1/1977 | Williams et al. | 52/400 |
| 4,148,961 | 4/1979 | Paulus et al. | 428/358 |

FOREIGN PATENT DOCUMENTS

| 259492 | 6/1965 | Australia | 52/716 |
|---|---|---|---|
| 1230894 | 5/1971 | United Kingdom | 52/208 |

Primary Examiner—Alfred C. Perham  
Attorney, Agent, or Firm—Leydig, Voit, Osann, Mayer & Holt, Ltd.

[57] ABSTRACT

A window glass mounting arrangement comprises flexible material which is formed to define first and second channels side-by-side and facing in opposite directions. The first channel is sized to fit over and grip a support member surrounding the window opening so that the second channel then runs alongside the window opening for receiving the window glass. The wall of the second channel furthest from the first channel has a slot for receiving a stiffening member for stiffening that wall so as to secure the window glass in the second channel. The material defining the first channel has embedded in it a metal carrier of substantially channel-shape which is capable of a limited amount of lengthwise compression but substantially no lengthwise stretching. The arrangement is made slightly oversize and then compressed into the opening. This enables the glass to "float" slightly in use and reduces stretching of the rubber at bends in the opening.

15 Claims, 8 Drawing Figures

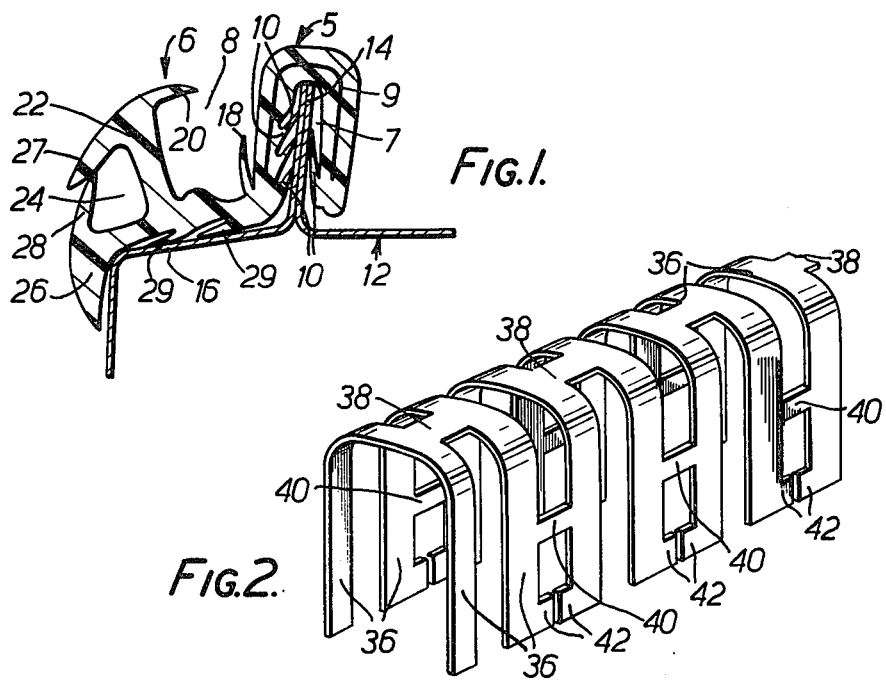
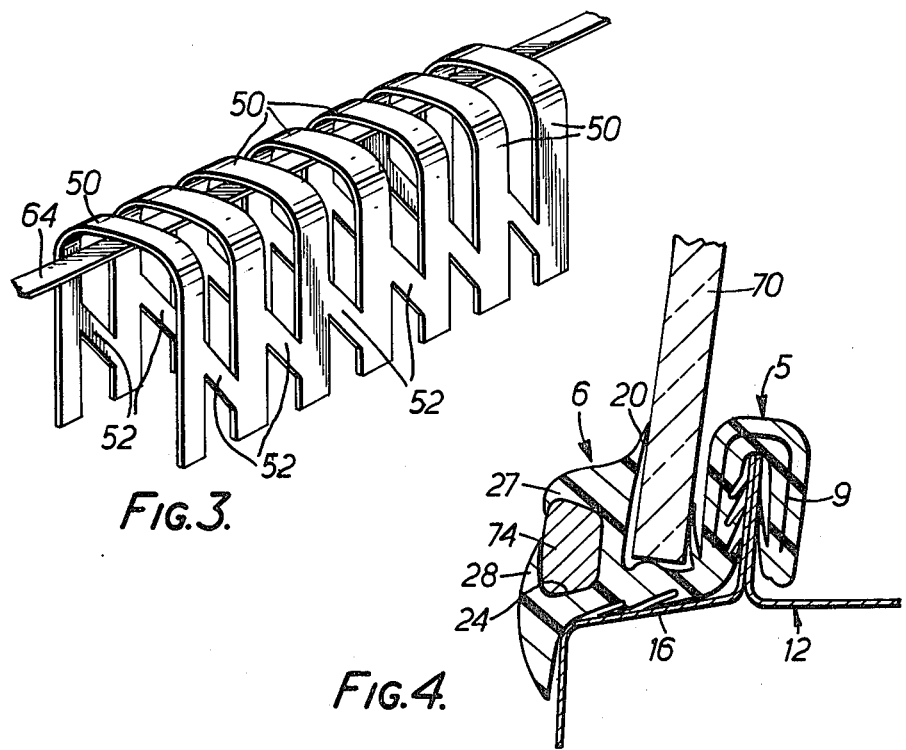

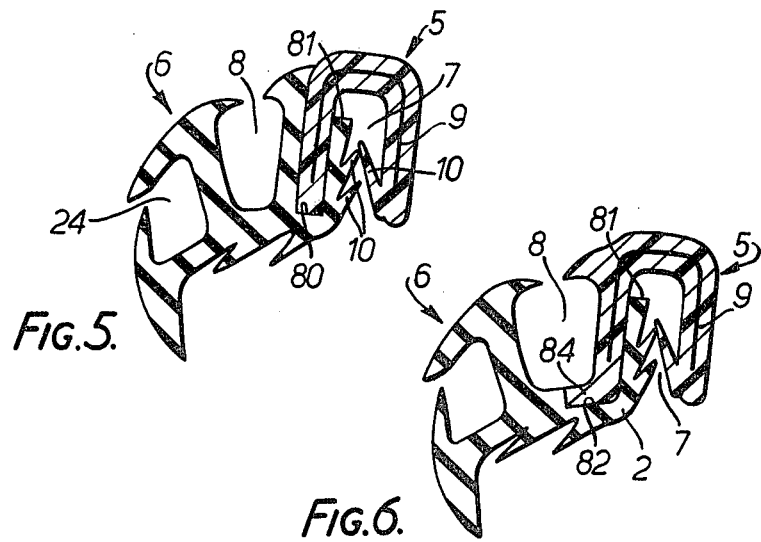
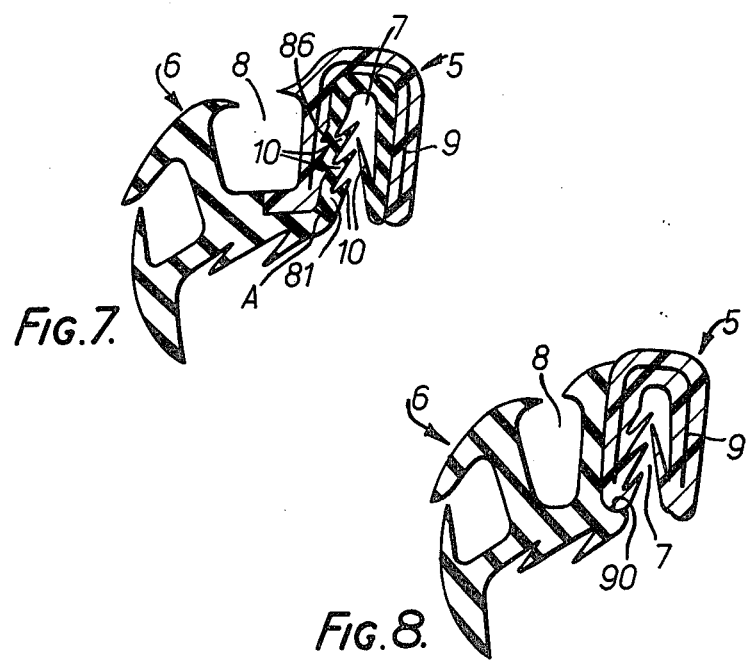

WINDOW GLASS MOUNTING ARRANGEMENTS

BACKGROUND OF THE INVENTION

The invention relates to mounting arrangements for mounting window glass, such as for example for mounting motor vehicle windshields.

It is important that window glass, particularly windshield glass in a motor vehicle, be securely held in position. For example, it should be held sufficiently firmly to remain in place if struck by an occupant of the vehicle in the event of an accident. It is also necessary that the glass be easy to fit and that it be mounted in a way which cushions it from shock. These various requirements can conflict.

It is an object of the invention to provide an improved window glass mounting arrangement.

Another object of the invention is to provide an improved method of mounting window glass in position.

BRIEF SUMMARY OF THE INVENTION

According to the invention, there is provided a window glass mounting arrangement, comprising flexible material which is formed to define first and second channels substantially side-by-side and facing in opposite directions, the first channel being sized to fit over and grip a support member surrounding the window opening so that the second channel then runs alongside the window opening for receiving the window glass, the wall of the second channel furthest from the first channel having means for receiving a stiffening member for stiffening that wall so as to secure the window glass in the second channel, the material defining the first channel having embedded in it a metal carrier of substantially channel-shape which is capable of a limited amount of lengthwise compression but substantially no lengthwise stretching.

According to the invention, there is also provided a method of mounting a window glass in a window opening using a mounting arrangement made of flexible material which is shaped to define first and second channels substantially parallel and side-by-side and facing in opposite directions, in which the material defining the first channel has embedded in it a metal reinforcing carrier which permits a limited amount of lengthwise compression but substantially no lengthwise stretching, and in which the length of the mounting channel is slightly oversize in relation to the periphery of the windscreen opening, the method comprising the steps of compressing the mounting arrangement lengthwise of the channels, so as to make its said length correspond with the periphery of the window opening, and then fitting the first channel over, so as to grip, a support member running around the window opening, thereby positioning the second channel to run around the window opening with its mouth facing towards the centre of the opening, bending outwardly of the second channel the wall thereof which is furthest from the first channel and placing the peripheral edge of the window glass in the second channel, allowing the bent-out wall of the second channel to resile, and attaching to the outside of the said wall of the second channel a stiffening member to secure the window glass in the second channel.

DESCRIPTION OF THE DRAWINGS

Mounting arrangement embodying the invention, and methods according to the invention, all for mounting a motor vehicle windscreen or windshield in a vehicle body, will now be described, by way of example only, with reference to the accompanying diagrammatic drawings in which:

FIG. 1 is a cross-sectional view of the arrangement after mounting on a retaining flange of the vehicle;

FIG. 2 is a perspective view of one form of metal carrier which may be incorporated in the mounting arrangement;

FIG. 3 is a view corresponding to FIG. 2 but showing another form of metal carrier which may be incorporated in the mounting arrangement;

FIG. 4 corresponds to FIG. 1 but shows a final stage in the process of fitting the windscreen in the arrangement; and FIGS. 5 to 8 show cross-sections through modified forms of the arrangements.

DESCRIPTION OF PREFERRED EMBODIMENTS

The mounting arrangement is made of resilient material such as plastics or rubber material and comprises first and second integral parts 5 and 6 which define respective channels 7 and 8 facing in generally opposite directions. The part 5 is reinforced with a channel-shaped metal core or carrier 9, to be described in detail below, and the opposite inside facing walls of the channel defined in this part are provided with integral gripping ribs 10. In use, and as shown in FIG. 1, the mounting arrangement is fitted onto the motor vehicle body 12 so that the channel 7 in the part 5 is placed over, and grips the opposite sides of, a flange 14 which forms part of the vehicle bodywork and runs around the windscreen opening.

When the part 5 is so fitted, the part 6 lies alongside it, but outside the windscreen opening, and rests, in this example, on a part 16 of the vehicle body.

The part 6 is not reinforced with a metal core or carrier. One of its inside walls defines a rib 18 and the other has a projecting tongue 20. The free side wall 22 of the part 6 defines a groove 24, and this side wall of the part 6 is extended to form a tongue 26. The groove 24 has an open mouth but this is shown partially closed off in FIG. 1 by overlapping flaps 27 and 28. The base of the part 6, that is, the region resting on the bodywork surface 16, is provided with flexible tongues 29.

FIG. 2 shows in more detail one form which the metal carrier 9 embedded in the flexible material of the part 5 can take.

As shown in FIG. 2, the metal carrier 9 comprises a series of generally U-shaped metal elements 36 which are arranged side-by-side and spaced apart to define a channel. Each element 36 is connected to the adjacent element 36 on one side by only a single connecting link 38, this connecting link 38 connecting the bases of the respective elements 36 together. Each element 36 is connected to the adjacent element 36 on its other side by two connecting links 40, each connecting link 40 connecting an intermediate point on one of the legs of that element to an intermediate point on the corresponding leg of the adjacent element on that side.

In addition, the distal end of each leg which is connected to an adjacent leg by one of the connecting links 40 carries an extension 42 which terminates immediately adjacent to a corresponding extension 42 on the corresponding leg, and may in fact abut it.

The carrier is preferably made of metal and the connecting links 38 and 40, and the extensions 42 are preferably integral with the elements 36.

As shown in FIG. 3, another form which the carrier can take comprises a series of U-shaped elements 50 which are connected together by connecting links 52 interconnecting their legs. Each connecting link 52 is inclined to the direction of extension of the legs which it interconnects. In addition, a flexible substantially inextensible tape member 64 runs along the length of the carrier on the inside of the channel shape defined by the carrier.

The flexible substantially inextensible tape member 64 may be made of any suitable material, such as a suitable synthetic material. It may comprise glass fibre threads, for example, possibly adhesively secured to a polyester tape which in turn can be self-adhesively secured to the elements of the carrier. Instead, for example, it could comprise a woven lattice-like tape made of polyester threads. The tape member 64 need not be directly secured to the metal of the carrier. Instead, for example, it can be laid along the carrier and secured to the carrier indirectly by being embedded, together with the carrier, within the flexible plastics or rubber material. The carrier shown in FIG. 3 therefore resists stretching (by virtue of the presence of the flexible tape member 64), but the inclined connecting links 52 permit some compression of the carrier.

In a modification, the links 52 could be omitted so that the elements 50 would be connected together only by the covering material and the member 64.

In another form (not illustrated), the carrier may comprise looped metal wire arranged to define a channel, and having one or more flexible substantially inextensible threads running along the length of the carrier and, for example, looped round the wire, or simply straight transverse wire elements linked together by a substantially inextensible longitudinal wire.

In each case, the mounting arrangement may be produced by an extrusion process, using a cross-head extruder for embedding the metal carrier 9. The mounting arrangement may be made in a continuous ring sized to fit onto the bodywork flange 14 completely surrounding the windscreen opening.

A windscreen glass 70 is fitted into and secured in the mounting arrangement by placing its peripheral edge in the channel 8 after bending outwards the wall 22 (if necessary, this process may be assisted by placing a cord or wire in the base of the channel 8 around the complete periphery and then pulling outwards, the cord being removed when the glass is seated in the channel, to allow the wall 22 to resile). As shown in FIG. 4, a stiffening strip 74, made of metal for example, is then inserted into the groove 24 in the wall 22. The stiffening strip 74 runs around the entire windscreen opening and holds the windscreen glass 70 against dropping out either forwardly or rearwardly of the opening.

The designs of the carrier 9 referred to above are advantageous in that they permit some limited lengthwise compression of the mounting arrangement but resist stretching. In the case of the carrier shown in FIG. 2, stretching is resisted because the extensions 42 prevent or limit the extent of possible movement towards each other of the distal ends of the legs of the alternate pairs of the element 36. When longitudinal pull is applied to the carrier, the legs which are connected together by the links 40 tend to pivot on the links so as to tend to move the distal ends of both legs together, and by resisting this movement of the distal ends of those legs, the extensions 42 prevent or limit the stretching of the carrier and thus of the complete strip.

In the case of the carrier shown in FIG. 3, stretching is resisted by the tape 64.

In the case of the wire-formed carrier referred to above (but not illustrated), stretching is resisted by the longitudinal thread or threads.

The ability to resist stretching is important because the mounting arrangement may be subjected to longitudinal tension during or immediately after manufacture, for example before it is formed into a closed ring or while it is being prepared for fitting onto, or actually being fitted onto the vehicle bodywork. If stretching could take place, then subsequent resiling of the mounting arrangement would cause it to be ill fitting.

The ability of the carriers described to undergo some compression is advantageous because it enables the mounting arrangement to be produced with such peripheral length that it has to be compressed lengthwise to a limited extent before fitting the part 5 onto the flange 14 (and the arrangement may in fact be slightly oversized for this purpose). This enables it to take up tolerances in the size of the windscreen opening, and enables the windscreen glass 70 to "float" to at least a slight extent in the part 6 when finally fitted. This better enables the windscreen glass to absorb shocks and strain due to slight movement of the bodywork that may take place in use of the vehicle. Another important advantage of compressibility is that it offsets to a considerable extent the tension which may be generated in the plastics or rubber material when the mounting arrangement is curved to fit the corners or bends in the flange 14 at the corners or bends of the windscreen opening; when the covering material is rubber, it is particularly important to reduce the generation of such tension to the rubber because it accelerates the ageing process in the rubber and could cause the rubber to crack.

FIG. 5 to 8 show modified forms which the arrangement can take and parts in these Figures corresponding to parts in FIGS. 1 to 4 are similarly referenced.

The mounting arrangement shown in FIG. 5 differs from the mounting arrangement shown in FIGS. 1 and 4 in that, in the mounting arrangement of FIG. 5, the parts 5 and 6 are not integral, the part 5 (in this example) being made of plastics material (apart from the metal carrier 9) such as polyvinylchloride (PVC) while the part 6 is made of soft rubber. This enables the part 5 to be more easily coloured or decorated so as to present a pleasing appearance on the inside of the vehicle.

As shown, the part 6 is formed with a slot 80 into which one side wall of the part 5 is inserted. As shown, a side piece 81, forming one side wall of the slot 80, has gripping ribs 10 formed thereon which, in use, co-operate with a gripping rib 10 on the opposite side wall of the part 5 to press into gripping and sealing engagement with opposite sides of the bodywork flange on which the bodywork is mounted. This action also holds the side wall 81 in the channel 7 and thus holds the parts 5 and 6 together, though this may be assisted by adhesive if desired.

The mounting arrangement of FIG. 6 differs in that the part 6 is provided with a recess 82 and one side wall of the part 5 is extended outwards to form a shoulder 84 which sits in the recess 82 and may be secured therein by means of adhesive.

The arrangement of FIG. 7 differs from that of FIG. 6 in that the side piece 81 is extended around the entire inside surface of the part 5 so as to form a channel which, in use, embraces the bodywork flange. In this case, the extended channel-shaped piece 81 carries all the ribs 10.

As shown, part of the surface of the side piece 81 which bears against the inside surface of the part 5 is provided with serrations 86 which engage with corresponding serrations on the part 5. These serve to hold the parts 5 and 6 together (instead of, or in addition to, the use of adhesive).

In a modification of the arrangement of FIG. 7, the side piece 81 may be made of relatively harder rubber than the remainder of the part 6, the two different types of rubber being formed integrally as by means of a duplex extrusion process. The dividing line between the relatively hard and relatively soft rubbers could be as shown at A. Other modifications, however, are possible. For example, instead of making the whole of the side piece 81 of relatively hard rubber, the gripping ribs 10 could be relatively softer because this may be found to improve their gripping and sealing properties.

In the arrangement of FIG. 8, the part 6 does not extend into the channel formed by the part 5. Instead, the part 6 is recessed at 90 and one side wall of the part 5 is placed into this recess and stuck in position.

In all cases, the part 5, being plastics, can more easily be coloured or decorated to give a pleasing appearance while the material defining the channel 8 remains strong enough to hold the windscreen glass in position.

The forms shown in FIGS. 5 and 8 differ from those of FIGS. 6 and 7 in that, in the former, the channel 8 is formed entirely in the rubber part 6, while in the latter, one side of the channel is formed by the part 5.

What is claimed is:

1. A window glass mounting arrangement, comprising
   flexible material which is formed to define first and second channels substantially side-by-side and facing in opposite directions,
   the first channel being sized to fit over and grip a support member surrounding the window opening so that the second channel then runs alongside the window opening for receiving the window glass,
   a stiffening member,
   the material defining the first channel having embedded in it a metal carrier of substantially channel-shape which enhances the grip of the material of the first channel on the support member, the metal carrier being associated with means positively preventing significant lengthwise stretching thereof but without preventing a limited amount of lengthwise compression,
   the wall of the second channel furthest from the first channel being entirely free of any embedded and inseparable metal reinforcement and being freely bendable outwardly away from the support member to receive the window glass in the second channel and defining means for receiving the said stiffening member for stiffening that wall after it has resiled, so as to secure the window glass in the second channel.

2. An arrangement according to claim 1, in which the carrier comprises a series of substantially U-shaped side-by-side elements in combination with a substantially inextensible member which runs along the length of the carrier and is secured thereto.

3. An arrangement according to claim 2, in which the member is secured to the carrier by means of adhesive.

4. An arrangement according to claim 2, in which the member is secured to the carrier by being embedded in the flexible covering material.

5. An arrangement according to claim 2, in which the member is in the form of a tape, made up of threads of polyester woven together.

6. A window glass mounting arrangement, comprising
   flexible material which is formed to define first and second channels substantially side-by-side and facing in opposite directions,
   the first channel being sized to fit over and grip a support member surrounding the window opening so that the second channel then runs alongside the window opening for receiving the window glass,
   a stiffening member,
   the wall of the second channel furthest from the first channel defining means for receiving the stiffening member for stiffening that wall so as to secure the window glass in the second channel,
   the material defining the first channel having embedded in it a metal carrier of substantially channel-shape which is capable of a limited amount of lengthwise compression but substantially no lengthwise stretching;
   the said carrier comprising
   a series of substantially U-shaped side-by-side elements arranged side-by-side in spaced relationship so as to define a channel, all adjacent elements being connected together by short connecting links,
   the elements of some of the adjacent pairs of elements being connected together only by links of a first type each of which extends between the bases of those elements, and
   the elements of the remaining pairs of adjacent elements being connected together only by links of a second type each of which extends from one leg of one of the elements to the corresponding leg of the adjacent element,
   each leg which is connected to another leg by a link of the second type also having limiting means for preventing or limiting the extent to which its distal end can move towards the distal end of the said other leg.

7. An arrangement according to claim 1 or 2, in which the part of the flexible material defining one said channel is separate from the part of the flexible material defining the other channel but is secured thereto.

8. An arrangement according to claim 7, in which the two separate parts of the flexible material are secured together adhesively.

9. An arrangement according to claim 7, in which the one of the two separate parts of flexible material which defines the wall of the second channel furthest from the first channel is made of rubber material and the other of the two parts is made of plastics material.

10. An arrangement according to claim 1 or 2, in which the flexible material is in the form of two separate channel-shaped parts which are secured together to define the first and second channels.

11. An arrangement according to claim 10, in which the two separate parts of the flexible material each define a single channel and are fitted together with one side wall of the channel of each of the parts inserted into the channel of the other part so that the two side walls of each of the first and second channels are defined by flexible material of the two separate parts respectively.

12. An arrangement according to claim 11, in which the base of one of the two single channels has a recess running along its length in which the distal edge of the said one side wall of the other single channel is inserted.

13. An arrangement according to claim 10, in which one of the two separate parts of flexible material defines a relatively wide channel and a relatively narrow slot arranged side-by-side and facing in the same direction and the other part defines a single relatively wide channel, the two parts being fitted together so that the side wall of the single channel of the said other part is inserted into the mouth of and secured within the relatively narrow slot of the said one part, whereby the said second channel is defined by the relatively wide channel of the said one part and the said first channel is defined by a portion of the inside of the single channel of the said other part and by a portion of the outside of the relatively narrow slot of the said one part.

14. A window glass mounting arrangement, comprising flexible material which is formed to define first and second channels substantially side-by-side and facing in opposite directions, the flexible material being in the form of two separate channel-shaped parts which are secured together to define the first and second channels, in which one of the two separate parts of the flexible material defines two channels arranged side-by-side and facing in opposite directions and the other of the two parts defines a single channel, the two parts being fitted together so that the single channel of the said other part fits over and is secured to the outside of one of the two channels of the said one part, whereby the said second channel is defined by a portion of the inside of the other of the two channels of the said one part and by a portion of the outside of the single channel of the said other part and the said first channel is defined by the said one channel of the said one part, the first channel being sized to fit over and grip a support member surrounding the window opening so that the second channel then runs alongside the window opening for receiving the window glass, a stiffening member, the wall of the second channel furthest from the first channel defining means for receiving the stiffening member for stiffening that wall so as to secure the window glass in the second channel, the material defining the first channel having embedded in it a metal carrier of substantially channel-shape which is capable of a limited amount of lengthwise compression but substantially no lengthwise stretching.

15. An arrangement according to claim 14, in which the base of the said other of the two channels of the said one part has a recess running along its length in which the distal edge of one side wall of the single channel of the said other part is inserted.

* * * * *